UNITED STATES PATENT OFFICE.

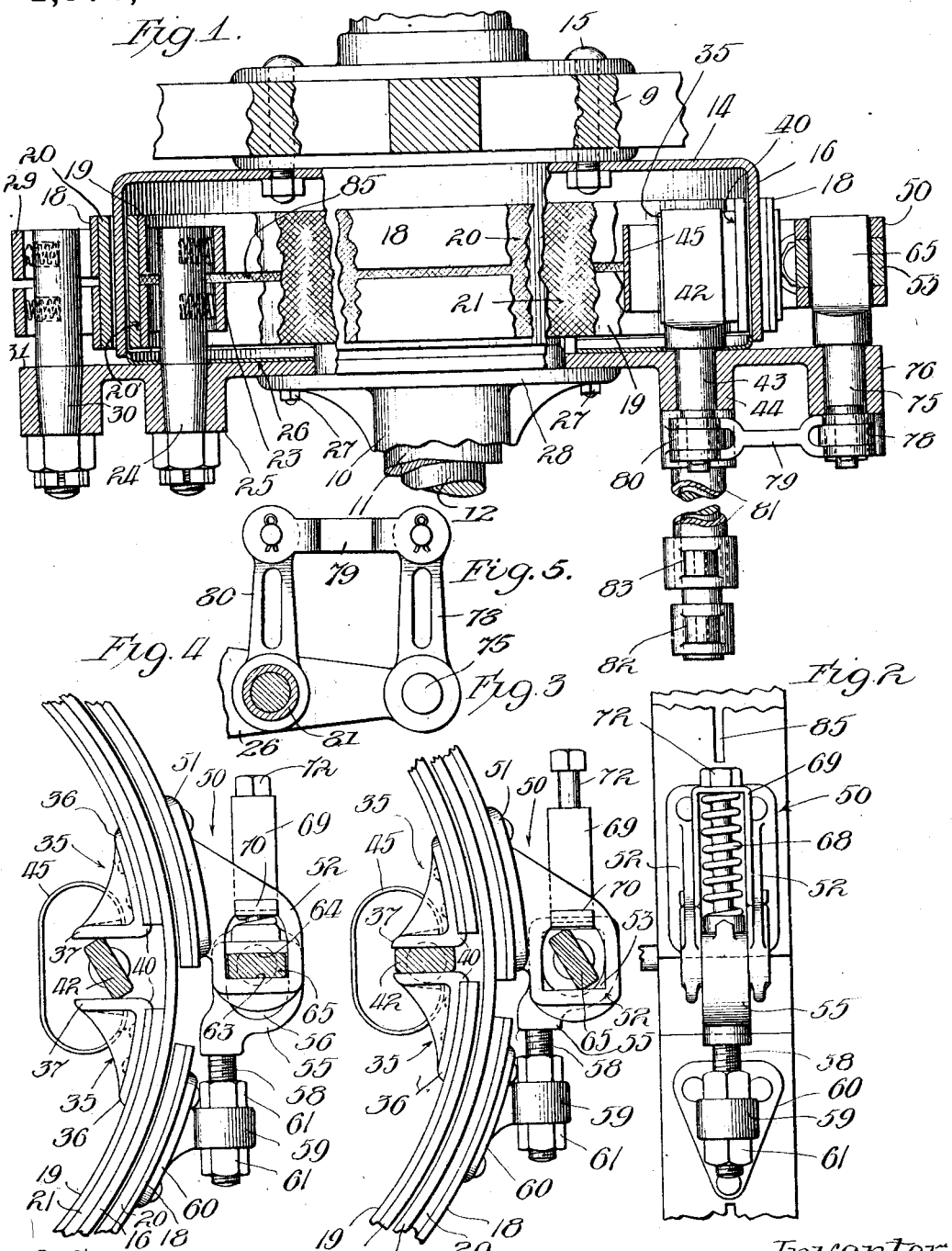

THOMAS I. DUFFY, OF CHICAGO, ILLINOIS, ASSIGNOR TO E. C. SALES CO., OF CHICAGO, ILLINOIS, A CORPORATION OF ILLINOIS.

BRAKE MECHANISM.

1,076,562.  Specification of Letters Patent.  Patented Oct. 21, 1913.

Application filed October 28, 1912. Serial No. 728,216.

*To all whom it may concern:*

Be it known that I, THOMAS I. DUFFY, a citizen of the United States, and a resident of Chicago, in the county of Cook and State of Illinois, have invented certain new and useful Improvements in Brake Mechanism; and I do hereby declare that the following is a full, clear, and exact description thereof, reference being had to the accompanying drawings, and to the characters of reference marked thereon, which form a part of this specification.

This invention relates to improvements in brake mechanism more especially adapted for rear or driving axles of motor vehicles and for analogous uses, and the invention consists in the matter hereinafter set forth and more particularly pointed out in the appended claims.

Among the objects of the invention is to provide improvements in brake mechanism embracing internal and external brake bands operating on the braking faces of a single brake drum, with means for operating said bands.

A further object of the invention is to provide means for operating an external brake band to tighten the same about the external braking face of the drum.

Another object is to provide an improved brake band adapted for use as an internal or external band designed to equalize the braking pressure transversely across the braking face or faces of the drum.

In the drawings: Figure 1 is a view partly in elevation and partly in section, with parts broken away, of a brake mechanism adapted for a rear or driving wheel of a motor driven vehicle embodying my invention. Fig. 2 is an elevation of the operating mechanism for the external brake band. Fig. 3 is a side elevation showing the means for operating both the external and internal brake bands. Fig. 4 is a view similar to Fig. 3 showing the parts in changed positions. Fig. 5 is a detail illustrating the means for operating both the internal and the external brake bands.

The brake mechanism is herein shown as applied to a full-floating type of rear or driving wheel axle for motor driven vehicles, wherein the hub 9 is mounted to rotate on the spindle 11 that is suitably fixed to the axle casing or housing 10 and is driven by suitable connection with the live axle or driving shaft 12 in any suitable manner, as for instance, like the construction shown in my co-pending application for U. S. Letters Patent, Serial No. 728,214 filed on the 28th day of October, 1912.

14 designates the brake drum which is attached to the hub 9, as by means of the bolts 15, the drum being provided with the usual cylindric flange 16 concentric with the driving shaft and extending inwardly from the hub. In the present construction, the inner and outer surfaces of the said flange 16 constitute the internal and external braking faces, respectively, of the drum.

18, 19 designate the internal and external brake bands, respectively, the former surrounding, and the latter contained within the flange of the brake drum. The said brake bands are provided on their braking sides with the usual fabric or other flexible friction faces 20, 21, respectively, adapted for direct contact with the braking faces of the drum.

The internal brake band is provided at one side of the axis of the drum with a loop or loops 23 through which extends an anchor stud 24 that is fitted within a boss 25 which is formed on the torque arm 26. Said torque arm is fixedly attached, as by means of screw bolts 27, to the flange 28 made integral, as herein shown, with the housing 10 of the axle. The external brake band is in like manner provided with a loop or loops 29 through which extends the anchor stud 30 that is, in like manner, carried by a boss 31 formed on an extension of the torque arm 26.

The ends of the internal brake band are provided with lugs or fittings 35 which are riveted or otherwise secured to the said band. As herein shown they comprise curved base portions 36 through which the fastening rivets extend, and inwardly turned portions 37 having proximate smooth faces connected to the base portions by the side ribs shown in Figs. 3 and 4. In order to relieve the attaching rivets of shearing stresses, which occur when the brake is expanded outwardly, said lugs are provided with lips 40 which overlap the end edges of the brake band in the manner shown in Fig. 4. The said internal brake band is expanded outwardly against the inner braking surface of the drum flange by means of a rocking expander member or cam 42 that is attached to or formed on a rock shaft 43 which is rockingly mounted in a boss or sleeve 44 carried by the adjacent end of the torque arm. The said lugs 35 are adapted to be held up against the expander member or cam 42, when the internal brake band is in its closed or non-braking position, by means of a C-shaped spring 45 engaging at its ends the outer or remote faces of the inturned portions 37 of the inner brake band lugs 35.

The internal brake band is shown in Fig. 3 in its inoperative or non-braking position and, at this time, the spring 45 holds the lugs of the band closely up against the expander member so as to prevent the parts rattling. In Fig. 4, the expander member or cam is shown as angularly adjusted to expand the internal brake band, such expansion occurring by reason of the oblong rectangular cross section of the expander member.

Referring now to the manner of operating the external brake band to bring the same against the external braking face of the drum, the same is made as follows: 50 designates a fitting or lug that is attached to one end of the external brake band. It comprises a base portion 51 and outstanding flanges or arms 52, 52, which are laterally separated to constitute, in effect, a divided lug. Said flanges or arms 52 are provided with transversely registering openings 53. Carried by the other end of said band is a fitting 55 that fits between the flanges or arms 52 and is provided with an opening 56 adapted to register with the openings 53 of the said arms or flanges. The said fitting 55 is herein shown as attached to the brake band by means of a stud 58 which is screw-threaded and extends through a lug 59, the base 60 of which is attached to the other end of the external brake band, the said stud being adjusted to the lug 59 by means of the nuts 61, 61 screw-threaded thereto on opposite sides of the lug and bearing against the latter. The openings in said fittings 50, 55 are provided with straight or parallel faces 63, 64, respectively, which oppose each other when the parts are assembled, as most clearly shown in Figs. 3 and 4. These faces of said fittings are adapted for engagement by a rocking member 65 which extends transversely through the openings 53, 56. The said rocking member 65 is of oblong rectangular cross section and one side thereof engages the flat face of one fitting, while the other side thereof engages the flat or straight faces of the other fitting. The parts are normally maintained with the straight faces 63, 64 in engagement with the rocking member 65, as most clearly shown in Fig. 4, by a suitable spring device to prevent the parts from rattling. The spring device herein shown consists of a spiral expansion spring 68 that is interposed between the fitting 50 and the closed end of the loop member 69 carried by the fitting 50, the loop member being herein shown as consisting of a flat strip of general U-shape with its terminals 70 carried through the openings in the side arms or flanges of the fitting 50 and bent backwardly about the same. The said spring 68 is held in position by means of a bolt 72 which extends through an opening in the closed end of the loop and is screw-threaded into the fitting member 50. When the expander member 65 is turned to the position indicated in Fig. 3, the external brake band is pressed against the external face of the drum, against the compression of the spring 68, as shown in Fig. 3 and, when braking pressure is released, the said spring 68 restores the brake band to its non-braking position and brings up the working faces of the fittings 50 and 55 against the rocking or contracter member so as to prevent the parts rattling.

The screw-threaded stud 58, by which the fitting 55 is attached to one end of the brake band, constitutes means whereby the working faces of the brake band fittings may be adjusted toward and from each other, and thereby properly adjust the band to the drum. The said rocking member 65 is formed on or is carried by a short rock shaft 75 that is rockingly mounted in a sleeve or boss 76 carried by or formed on an extension of the torque arm 26, as most clearly shown in Fig. 1.

The rock shaft 75 is provided with a fixed crank arm 78 which is connected, as by a link 79, with a crank arm 80 that is fixed rigidly to a tubular rock shaft 81 which surrounds and has bearing on the extended end of the rock shaft 43 associated with the internal brake band. The said solid and tubular rock shafts are provided with crank arms 82, 83 respectively, and the rock shafts are, in practice, made of a length to bring said crank arms or levers to the proper point for connection with the brake actuating levers. This construction is a simple one, enabling the internal and external bands of the drum to be operated by rocking members that rock or rotate on the same axis. As a further improvement in brake bands, I have herein shown each band as being slitted throughout almost the entire length thereof, the slit 85 being shown as located centrally of the band and extending longitudinally of the band from near the fitting member 50 at one end thereof adjacent to the lug 59 at the other end of the band. This construction enables the band to transversely adapt itself to the braking face of the drum, regardless of slight inaccuracies of fit between the parts. Where the brake band is made transversely inflexible it often occurs that the effective braking contact is along a comparatively narrow width of the band, so that the full braking effect is not realized.

I claim as my invention:—

1. A brake mechanism for motor vehicles comprising a drum provided with an external braking face, a brake band therearound, a slotted fitting attached to one end of said band, a fitting adjustably fixed to the other end of said band and overlapping the slotted fitting within the slot thereof, said fittings being provided with opposing faces at their overlapping parts, and a rocking contracter member between and acting directly on said faces.

2. A brake mechanism for motor vehicles comprising a drum provided with an external brake face, a brake band therearound, a slotted fitting attached to one end of said band, a fitting adjustably fixed to the other end of said band and overlapping the slotted fitting within the slot thereof, said fittings being provided with opposing faces at their overlapping parts, a rocking contracter member between and acting directly on said faces, and a spring acting on said fittings to normally hold said faces against the contracter member.

3. A brake mechanism for motor vehicles comprising a drum provided with an external braking face, a brake band therearound, a slotted fitting attached to one end of said band, a fitting overlapping the slotted fitting and provided with a screw-threaded stud, a lug attached to the other end of the brake band and having an opening through which the stud extends, with means for adjusting the stud on said lug, said fittings being provided at their overlapping parts with opposing faces and a rocking contracter member between and acting on said faces to contract the band on the braking face of the drum.

4. A brake mechanism for motor vehicles comprising a drum provided with an external braking face, a brake band therearound, a slotted fitting attached to one end of said band, a fitting overlapping the slotted fitting and provided with a screw-threaded stud, a lug attached to the other end of the brake band and having an opening through which the stud extends, with means for adjusting said stud on the lug, said fittings being provided at their overlapping parts with opposing faces, a rocking contracter member between and acting on said faces to contract the band on the braking face of the drum, and a spring to normally hold said faces of the fittings against the contracter member.

5. A brake mechanism for motor vehicles comprising a drum provided with an external braking face, a brake band therearound, a slotted fitting attached to one end of said band, a fitting overlapping the slotted fitting and provided with a screw-threaded stud, a lug attached to the other end of the brake band and having an opening through which the stud extends, with means for adjusting the stud on said lug, said fittings being provided at their overlapping parts with opposing faces, a rocking contracter member between and acting on said faces to contract the band on the braking face of the drum, a U-shaped member carried by said slotted fitting, a bolt or stud extending through said U-shaped member and into the other fitting and a spring surrounding the bolt and interposed between said U-shaped member and said other fitting.

6. A brake mechanism for motor vehicles comprising, in combination with a drum having internal and external brake faces, brake bands adapted to respectively co-act with said faces, rocking operating members between the ends of said bands for actuating them, a tubular shaft surrounding the rocking member of one band, said tubular shaft and the other rocking member being provided with crank arms, and a link connecting said arms.

7. A brake mechanism for motor vehicles comprising, in combination with a drum having internal and external brake faces, transversely divided bands adapted to respectively co-act with said faces, rocking operating members between the ends of the bands, the inner band being provided at its ends with fittings having opposing faces at the opposite sides of its rocking member to co-act with said latter member, and the outer band being provided at its ends with overlapping fittings having at the opposite sides of its rocking member opposing faces to coact with its said rocking member, and means to simultaneously rock said members to expand the inner bands against and to close the outer band upon their respective brake faces.

8. In a brake mechanism, the combination with a brake drum having a brake face, of a brake band acting thereagainst comprising a transversely continuous flexible friction member of a width to extend across the brake face, and a backing member to which the friction member is attached composed of a plurality of longitudinally separable parts whereby braking pressure of the friction member is equalized across the brake face, with means operating on the brake band to force it against said brake face.

In testimony that I claim the foregoing as my invention I affix my signature in the presence of two witnesses, this 18th day of October, A. D. 1912.

THOMAS I. DUFFY.

Witnesses:
W. L. HALL,
G. E. DOWLE.